(12) United States Patent
Arling et al.

(10) Patent No.: US 10,868,858 B2
(45) Date of Patent: *Dec. 15, 2020

(54) SYSTEM AND METHOD FOR APPLIANCE DETECTION AND APP CONFIGURATION

(71) Applicant: Universal Electronics Inc., Santa Ana, CA (US)

(72) Inventors: Paul D. Arling, Irvine, CA (US); Arsham Hatambeiki, Irvine, CA (US)

(73) Assignee: Universal Electronics Inc., Santa Ana, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/216,554

(22) Filed: Dec. 11, 2018

(65) Prior Publication Data
US 2019/0109894 A1    Apr. 11, 2019

Related U.S. Application Data

(63) Continuation of application No. 16/045,832, filed on Jul. 26, 2018, now Pat. No. 10,305,969, which is a
(Continued)

(51) Int. Cl.
*H04W 8/24* (2009.01)
*G06F 8/61* (2018.01)
(Continued)

(52) U.S. Cl.
CPC .............. *H04L 67/10* (2013.01); *G05B 15/02* (2013.01); *G06F 8/61* (2013.01); *H04W 8/24* (2013.01); *G05B 2219/2642* (2013.01)

(58) Field of Classification Search
None
See application file for complete search history.

(56) References Cited

U.S. PATENT DOCUMENTS 6,515,996 B1    2/2003   Tonnby et al.
7,143,214 B2 *  11/2006  Hayes ................... G06F 1/1626
                                                    710/72
(Continued)

FOREIGN PATENT DOCUMENTS

EP    1564972 A1    8/2005
WO    2013044344 A1   4/2013
WO    2018170504 A1   9/2018

OTHER PUBLICATIONS

ISA/US, Int. Search Report and Written Opinion issued on PCT application No. US19/67034, dated Mar. 9, 2020, 11 pages.
(Continued)

*Primary Examiner* — Isaac T Tecklu
(74) *Attorney, Agent, or Firm* — Greenberg Traurig, LLP (57) ABSTRACT

A system and method is used to provision an app to a smart device for use in connection with an appliance. A presence of the appliance on a wireless network which includes the smart device is detected and data received from the appliance is used to initiate a retrieval of the app. When the retrieved app is installed on the smart device the app is usable with the smart device to provide at least an interface between the smart device and the appliance. In some circumstance, installation of the app on the smart device may also include causing the app to be synchronized with a corresponding app that was prior installed on another smart device capable of communicating with the appliance.

13 Claims, 5 Drawing Sheets

Related U.S. Application Data continuation of application No. 14/277,968, filed on May 15, 2014, now Pat. No. 10,063,625.

(51) Int. Cl.
*H04L 29/08* (2006.01)
*G05B 15/02* (2006.01)

(56) References Cited

U.S. PATENT DOCUMENTS

| | | | | |
|---|---|---|---|---|
| 7,266,777 | B2* | 9/2007 | Scott | G08C 17/02 348/734 |
| 8,606,889 | B2 | 12/2013 | Kazan et al. | |
| 8,812,629 | B2* | 8/2014 | Arling | G08C 23/04 709/220 |
| 8,898,759 | B2* | 11/2014 | Schultz | G06F 21/44 709/203 |
| 2004/0010327 | A1* | 1/2004 | Terashima | G05B 15/02 700/83 |
| 2005/0076153 | A1* | 4/2005 | Nedellec | H04L 12/2805 709/250 |
| 2005/0138179 | A1 | 6/2005 | Encarnacion et al. | |
| 2005/0154787 | A1* | 7/2005 | Cochran | G06F 9/4411 709/219 |
| 2005/0159823 | A1 | 7/2005 | Hayes et al. | |
| 2006/0075398 | A1* | 4/2006 | Bennett | G06F 9/5055 717/170 |
| 2006/0271925 | A1 | 11/2006 | Schuelein et al. | |
| 2007/0118499 | A1 | 5/2007 | Hwang et al. | |
| 2007/0156842 | A1* | 7/2007 | Vermeulen | H04L 29/06047 709/217 |
| 2008/0300967 | A1* | 12/2008 | Buckley | G06Q 30/02 705/7.34 |
| 2010/0082176 | A1 | 4/2010 | Chang | |
| 2010/0134317 | A1* | 6/2010 | Breuil | G08C 17/02 340/12.28 |
| 2011/0138327 | A1 | 6/2011 | Scott et al. | |
| 2011/0179149 | A1* | 7/2011 | Kazan | G06F 9/4451 709/221 |
| 2011/0289113 | A1 | 11/2011 | Arling et al. | |
| 2012/0086563 | A1 | 4/2012 | Arling et al. | |
| 2012/0210268 | A1 | 8/2012 | Hilbrink et al. | |
| 2012/0250627 | A1* | 10/2012 | McCormack | H04L 61/2046 370/328 |
| 2013/0041959 | A1 | 2/2013 | Bengtsson | |
| 2013/0074062 | A1* | 3/2013 | Arnold | G05B 19/0426 717/171 |
| 2014/0095692 | A1* | 4/2014 | Anderson | G06F 11/3093 709/224 |
| 2014/0111318 | A1* | 4/2014 | Arling | H04N 21/42226 340/12.22 |
| 2014/0176309 | A1 | 6/2014 | Wang et al. | |
| 2014/0218620 | A1 | 8/2014 | Griffin et al. | |
| 2014/0222436 | A1 | 8/2014 | Binder et al. | |
| 2014/0223423 | A1* | 8/2014 | Alsina | G06F 8/65 717/173 |
| 2014/0359595 | A1* | 12/2014 | Sehgal | G06F 8/61 717/171 |
| 2015/0154002 | A1 | 6/2015 | Weinstein et al. | |
| 2015/0227356 | A1 | 8/2015 | Byrnes et al. | |
| 2017/0111351 | A1* | 4/2017 | Grajek | G06F 16/955 |
| 2018/0152557 | A1 | 5/2018 | White et al. | |
| 2018/0196683 | A1 | 7/2018 | Radebaugh et al. | |
| 2018/0261223 | A1 | 9/2018 | Jain et al. | |

OTHER PUBLICATIONS

Israel Patent Office, Office Action issued on Israel patent application No. 248593, 5 pages.
European Patent Office, Examination Report issued on European patent application No. 15792162.8, dated May 25, 2020, 10 pages.
CNIPA, Office Action issued on Chinese patent application No. 201580002352.3, 5 pages.
USPTO, Non-Final Office Action issued on U.S. Appl. No. 16/382,796, dated Jun. 9, 2020, 16 pages.
ISA/US, International Preliminary Report on Patentability issued on PCT application No. US15/30255, dated Nov. 24, 2016, 6 pgs.
European Patent Office, extended search report issued on European patent application No. 15792162.8, 11 pgs.

\* cited by examiner

SYSTEM AND METHOD FOR APPLIANCE DETECTION AND APP CONFIGURATION

RELATED APPLICATION INFORMATION

This application claims the benefit of and is a continuation of U.S. application Ser. No. 16/045,832, filed on Jul. 26, 2018, which application claims the benefit of and is a continuation of U.S. application Ser. No. 14/277,968, filed on May 15, 2014, the disclosures of which are incorporated herein by reference in its entirety.

BACKGROUND

Personal communication, productivity, and entertainment devices such as cellular phones, tablet computers, e-books, hand-held games, portable media players, PDAs, etc. are known to include features such as graphical user interfaces on color touch screens, Bluetooth and/or WiFi capability, etc. Many such devices also incorporate support for ancillary applications (hereafter referred to as "apps") for example calendars, email, games, social media interfaces, maps and navigation, etc. Furthermore, in some instances support for such apps may also be provided as a feature of certain entertainment appliances such as for example so-called "smart TVs," cable or satellite set top boxes, etc. For the sake of brevity, all such app capable devices whether personal/portable or appliance-based, will be collectively referred to hereafter as "smart devices."

Contemporaneously, an increasing number of household appliances such as for example thermostats, clothes washer/driers, dishwashers, refrigerators, solar power arrays controllers, etc., are becoming network enabled, i.e., these appliances are capable of communicating status and/or receiving commands over a local and/or wide area network. In order to fully utilize such features however, the user of such an appliance may be required to locate and download into a smart device an appliance manufacturer supplied app which serves to provide an appropriate appliance interface. A user may not be notified that there is an app available for downloading into a single operating system or across different operating systems (hereafter referred to as "OS") and the user may need to manually sign into each device which may contain the desired OS. To overcome the above described problem, the system and method described hereinafter will present a set up agent which may automate the app synchronization and the app login authentication which may utilize an automated procedure.

SUMMARY

This following relates generally to methods for enabling user interaction with various suitably equipped appliances by way of appropriate manufacturer supplied apps which may be presented or downloaded to a smart device. In particular, a setup agent program resident in a smart device may periodically scan a local wireless environment (e.g., network and/or app owner information) for the purpose of detecting the presence of one or more app-supported appliances, either automatically or at user request. When the presence of such an appliance is detected, the setup agent may initiate a download of an appropriate app into the client smart device for the detected appliance(s) or, in those cases where a suitable app is found to be already installed in the client smart device, the setup agent may initiate any actions necessary to synchronize the instant app with the newly detected appliance. Such steps may include, for example, status download and update, transfer of user authentications, etc. The setup agent may make use of a cloud based service or services to determine if an app is available for a newly detected appliance and if so, the source from which to download that appliance manufacturer-specific app; to coordinate, authenticate and synchronize similar apps across all smart devices currently present in an environment; etc.

A better understanding of the objects, advantages, features, properties and relationships of the subject systems and methods will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the described systems and methods, reference may be had to preferred embodiments shown in the attached drawings in which:

FIG. 3 illustrates in block diagram form an exemplary smart device which may be used in the exemplary systems of FIGS. 1 and 2a;

DETAILED DESCRIPTION

Figure 1:
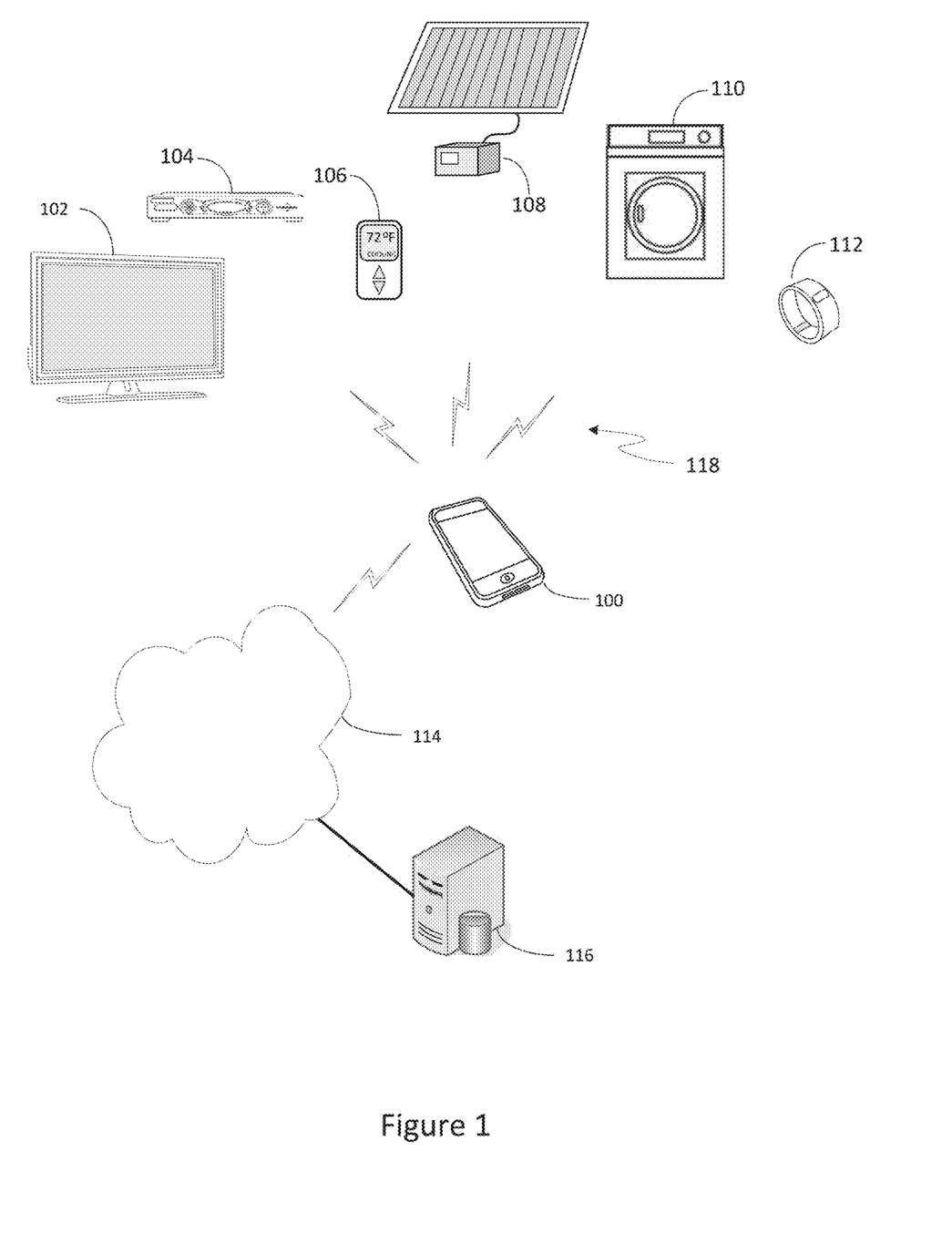
FIG. 1 illustrates an exemplary system in which an app-equipped smart device may be utilized to interface several different appliances.

With reference to FIG. 1, there is illustrated an exemplary system in which apps installed on a smart device 100 may provide interfaces to various controllable appliances, such as, for example, a television 102, a cable or satellite set top box 104, a thermostat 106, a solar power array controller 108, a clothes washer and/or drier 110, a personal fitness tracker or pedometer 112, etc. The interfaces may be used to display information relevant to the operation and/or states of such devices, to communicate with and/or control such devices, etc. To this end, all of these appliances may communicate with smart device 100 using an available local wired or wireless network 118 such as, for example, WiFi, Bluetooth, etc., or any other convenient means. It will be appreciated that depending on the particular networking technology in use various other items such as access points, routers, Internet gateways, etc., may be required in order to fully implement the illustrative network 118—in the interests of clarity these are omitted from FIG. 1. Also as illustrated in FIG. 1, smart device 100 may be adapted to communicate with one or more remote servers 116 by way of a wide area network 114, such as for example the Internet.

It should be appreciated that, while an exemplary embodiment is presented herein in terms of a group of household and/or personal appliances 102 through 112, the methods described herein may broadly apply to any group of appliances or equipment the elements of which support app driven user interfacing, for example without limitation those as may be found in offices, factories, schools, theaters, etc. Accordingly the exemplary embodiment described hereafter is intended to be illustrative and not limiting.

Figure 2A:
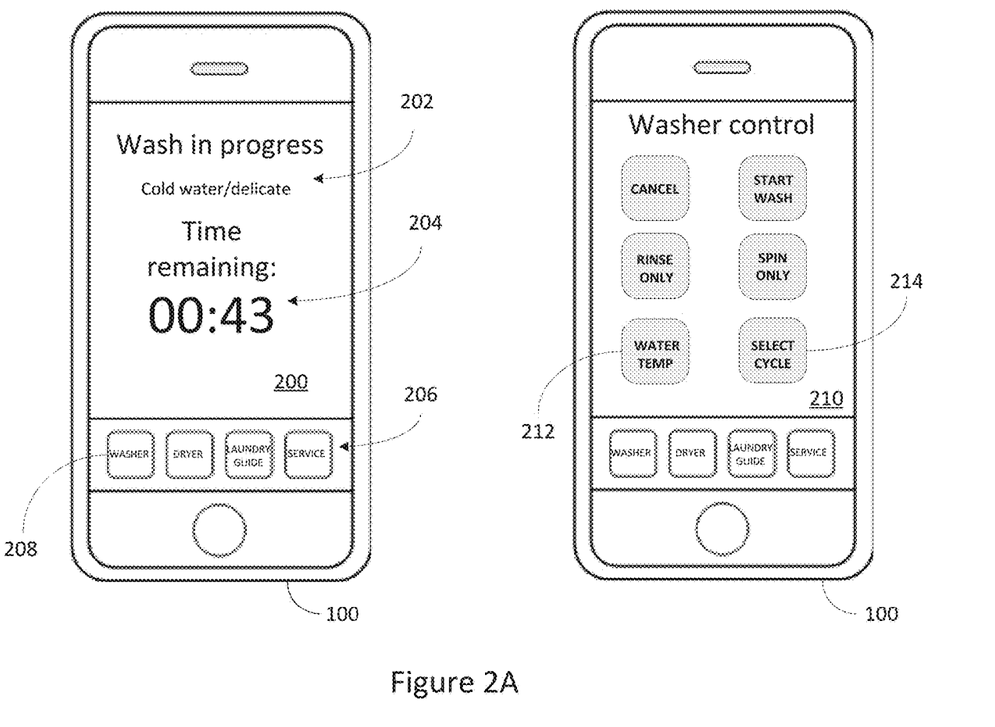
FIGS. 2a and 2b illustrate exemplary smart device app-generated user interfaces appropriate for interacting with one of the appliances of FIG. 1.
Figure 2B:
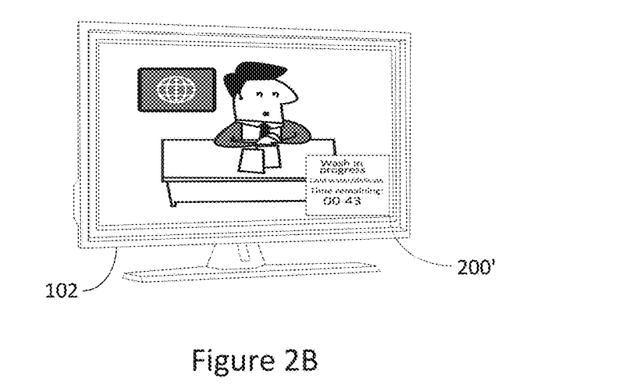

Turning now to FIG. 2a, an exemplary user appliance interface 200 presented by a manufacturer supplied app installed on smart device 100 is shown by way of illustration. When invoked by a user of the smart device, such an interface may display a current status of the appliance, in this illustrative example that of a clothes washer, including such exemplary items as the wash cycle currently being performed 202 and time remaining 206. User interface 200 may also include an exemplary user input area 206 with icons that are activable to access companion appliance (e.g., a clothes dryer), GUIs, user guides, troubleshooting diagnostics, etc., as well as an icon 208 which may access additional page(s) 210 of the current device GUI, for example to cancel the current operation, initiate other operations, or to invoke further submenus such as selection of water temperature 212 or fabric cycle 214. As illustrated by way of further example in FIG. 2b, an exemplary appliance app GUI 200' may be adapted as appropriate for use with other types of smart devices, for example a "smart TV" 102.

In certain embodiments, a displayed GUI page may contain HyperText Markup Language (hereafter referred to as "HTML") links for use in accessing appliance related information and/or services. Since methods for displayed HTML links are well known in the art, they will not be described in greater detail herein. Nevertheless, for additional details pertaining to HTML link operation, the reader may turn to commonly assigned U.S. application Ser. No. 13/542,146 (US 2012/0278693), filed on Jul. 5, 2012, entitled "System and Method for Ubiquitous Appliance Control," the disclosure of which is incorporated herein by reference in its entirety. A displayed HTML page may also function to provide notifications and selectable links which may inform a user that an app update or a new app is available for a single OS or across the different OSs in the user's environment for the one or more of appliances. The user may select the link to initiate a downloading of an app, an authentication of an app, and/or a commencement of a synchronization process. The GUI may include selectable links to user manuals for the user appliances which are located within the user's environment or may include links to specific web based literature which may be used to highlight the appliance features, or may notify the user that a new app may be available for a new OS for which an app was not available as of the last synchronization cycle, etc.

Figure 3:
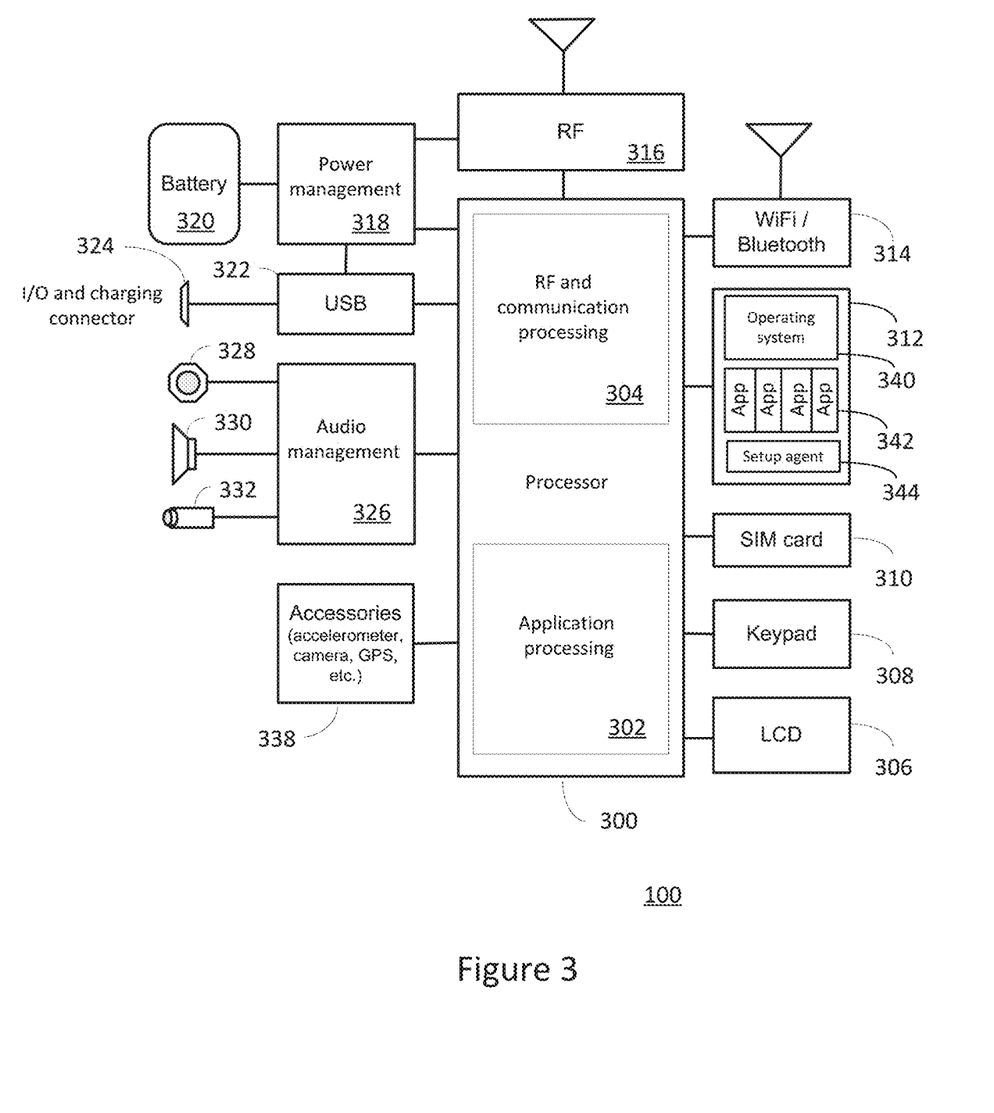

With reference to FIG. 3, as is known in the art, the smart device 100 of FIGS. 1 and 2a may include as needed for a particular application, processing means 300 which may comprise both an application processing section 302 and an RF/communication processing section 304; an LCD display 306; a keypad 308 which may comprise physical keys, touch keys overlaying LCD 306, or a combination thereof; a subscriber identification module (SIM) card 310; memory means 312 which may comprise ROM, RAM, Flash, or any combination thereof; WiFi and/or Bluetooth wireless interface(s) 314; a wireless telephony interface 316; power management circuitry 318 with associated battery 320; a USB interface 322 and connector 324; an audio management system 326 with associated microphone 328, speaker 330 and headphone jack 332; and various optional accessory features 338 such as a digital camera, GPS, accelerometer, etc. Programming may be provided and stored in memory means 312 to control the operation of smart device 100 by way of operating system 340 software such as for example iOS, Android, Linux, Web apps, etc., which operating software may support the download and execution of various add-on apps 342 as necessary for a particular purpose, all as well known in the art. As noted above, a setup agent software 344 is also provisioned to smart device 100 in order to facilitate detection, installation, and operation of manufacturer-supplied appliance interface apps, as will now be described in further detail. It is also to be understood that, while the illustrated smart device 100 is particularly adapted to receive input via use of a keypad and/or touchpad display that is provided as an integral part of the smart device 100, the smart device 100, or other like smart devices such as the TV illustrated in FIG. 2b, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 4:
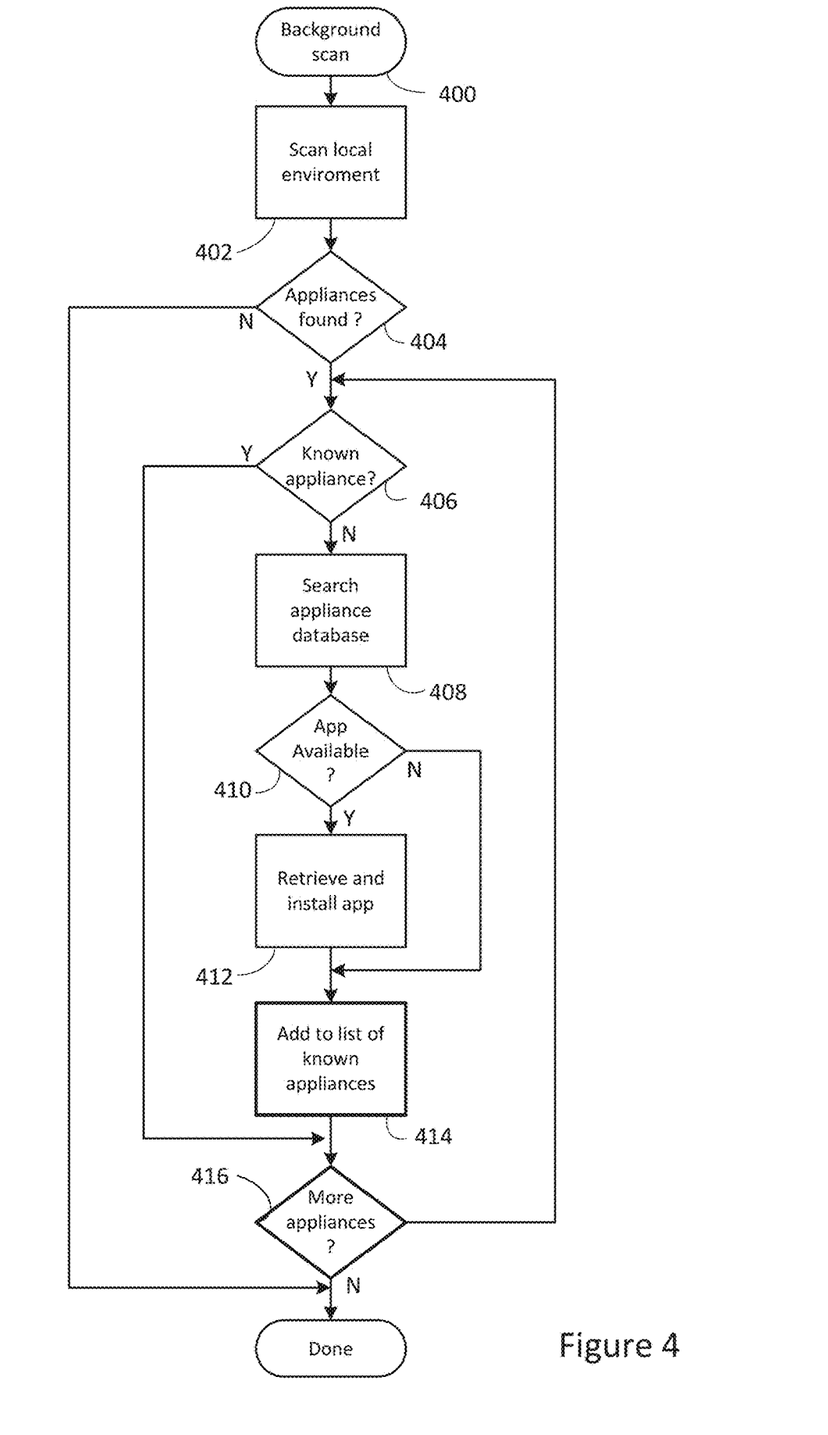
FIG. 4 illustrates in flow chart form an exemplary series of steps carried out by a smart device setup agent upon detection of a network enabled appliance in its environment.

With reference now to the flowchart of FIG. 4, at step 400 the setup agent 344 may periodically initiate a scan 402 of its current wired or wireless, network environment (e.g., WiFi, Bluetooth, etc. or any combination thereof) in order to ascertain the presence of one or more networked appliances. This action may be initiated automatically (for example based on a timer which is used to measure predetermined periods of time, in response to the device being turned on, in response to a detected change in location of the smart device using for example its GPS or the like type of functionality, etc.), or when connecting to new networks, or may be manually initiated by a user of smart device 100 (for example in response to an activation of a user input element, in response to the smart device 100 being moved, etc.) as appropriate for a particular embodiment. If it is determined at step 404 that no responsive appliances are present in the environment, the setup agent actions are complete. If, however, responsive devices are detected on the wireless network, e.g., a device responds with data indicative of its identity in response to a polling request message sent from the smart device 100, then at step 406 the setup agent may next determine, using the information received, if a responsive appliance is already known to the setup agent, e.g., determine if the appliance has already been detected during a previous detection operation or otherwise manually indicated to the smart device 100. Such a determination may be made, for example, by consulting a setup agent-administered listing of appliance identities, maintained as will be described hereafter at step 414. If the appliance is already known to the setup agent, processing continues at step 416 to determine if further responsive appliances have been detected.

If it is determined that a newly-responsive appliance has been detected, then at steps 408 and 410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download. Such a database may be stored in local memory 312 as part of the setup agent programming, may be located at a cloud based data storage facility or server 116, or a combination thereof, as appropriate for a particular embodiment. If no app is available, processing continues at step 414, adding the instant appliance identity to the listing of known appliance identities. If it determined that an app is available, at step 412 the appropriate app may be recommended to the user or may be downloaded to the smart device 100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of smart device 100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download, or may be requested from smart device user each time download is to be performed.

When an app is downloaded and installed, in some embodiments the setup agent may register that app with a cloud based service, by way of forwarding unique identity information regarding the app and the environment (e.g., network and/or app owner information) in which it is operational to a server system such as for example the server 116 of FIG. 1. Such registration information may be subsequently utilized for the purpose of synchronizing multiple instances of the same app across different OS's, as will be further described hereafter in conjunction with FIG. 5.

In some embodiments, the setup agent may, in conjunction with the installation of certain apps which require specific equipment configurations, also generate macro command sequences as necessary to place various appliances into the required state upon initiation of the app. By way of illustration without limitation, a TV viewing or game show participation app may require that a TV 102 to be set to a particular input and/or a cable set top box 104 be tuned to a particular channel, etc., in which case a command sequence ("macro") may be created by the setup agent to be executed every time that app is initiated. As will be understood by those skilled in the art, a single GUI may display all of the app links and common macros across the OS's. Since methods for control of entertainment appliances and/or use of macros are well known in the art, these will not be discussed further herein, however for additional information the interested reader may turn to for example U.S. patent application Ser. No. 13/657,176 "System and Method for Optimized Appliance Control" or Ser. No. 13/071,661 "System and Method for Facilitating Appliance Control via a Smart Device", both of common ownership and both incorporated herein by reference in their entirety.

Next, at step 414, the setup agent may add the current appliance identity into a local tabulation of known appliances. Such an identity may comprise a serial number, MAC address, or any other data value suitable to uniquely identify the appliance. Thereafter, at step 416 the setup agent may ascertain if additional responsive appliances were detected and, if so the process described above is repeated, until all responding appliances have been accounted for.

While not illustrated, in some embodiments, provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc.

Figure 5:
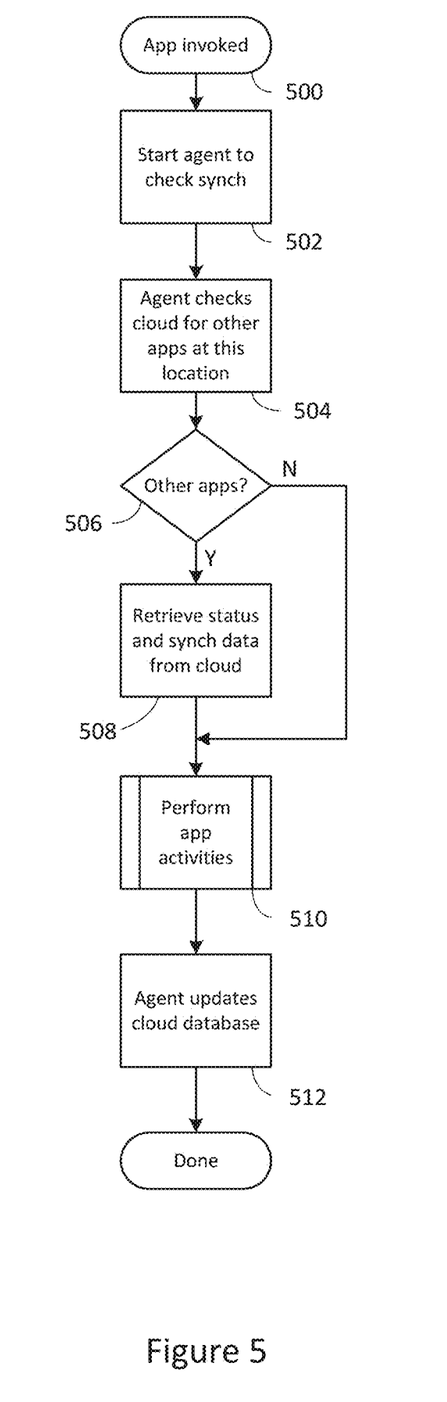
FIG. 5 illustrates in flow chart form an exemplary series of steps carried out by a smart device setup agent to synchronize status and other data across multiple instances of an appliance interface app.

With reference now to the flowchart of FIG. 5, when an individual appliance associated app, for example such as the app illustrated in FIG. 2*a*, is invoked at step 500, in some embodiments the app may initially invoke a setup agent at step 502 in order to effect synchronization of this app's appliance status values with those of any other instances of the same app which may be present in the current environment and/or resident on other devices registered to the same owner. To achieve this, at step 504 an exemplary setup agent 344 may access a cloud based database service, located for example on server 116, in order to determine if any other instances of this app are present in the current environment, have common ownership, and/or the like. To accomplish such a check, the setup app may provide a unique app identity and unique environment identity to the database service. As appropriate for a particular implementation, an app identity may comprise a label value assigned by the developer(s) of the app; a manufacturer and appliance model number; or any other data which may serve to uniquely identify the specific app. An environment identity may comprise a WiFi network name; access point address; one or more MAC addresses; a user id; etc; or any other data which may serve to uniquely identify the specific environment in which the app is currently active. The cloud based service may compare the provided values against a database of installed app information in order to determine if other instances of the app are present in the local environment and/or to determine if a corresponding app might be newly available for use on any of smart devices within the local area network. If an app is newly available, the app can be provisioned to such devices and synchronized with existing apps within the network as described above.

At step 506 it may be determined, based on the response from the database service, whether any other instances of this app are in fact registered at the current environment. If not, processing continues at step 510 where control may be returned to the app for the performance of the function(s) for which it was invoked. If, however, it is determined that other instances of the instant app are present, then at step 508 the most recently saved status of the app may be downloaded from the corresponding entry in the cloud database and used to pre-configure the current instance. Such status information may include, as required for a particular appliance and/or app, items such as control settings, progress indicators, reminders, timeouts, state switches, authentications, cookies, shopping cart contents, service information, error logs, etc., without limitation.

At step 510 the function(s) for which the app was invoked may then be performed, after which at step 512 updated app status data reflecting the new state of the app may be uploaded to the cloud database for storage and subsequent use by this or other instances of the app.

While various concepts have been described in detail, it will be appreciated by those skilled in the art that various modifications and alternatives to those concepts could be developed in light of the overall teachings of the disclosure. For example, while the illustrative embodiment above is presented in terms of a setup agent resident in a portable smart device such as a phone or tablet, it will be appreciated that the teachings herein may be equally applicable to other app-capable device such as for example without limitation "smart" TVs, cable or satellite set top boxes, streaming video devices, home automation systems, and the like.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for provisioning an app to a first smart device registered with a server device for use in connection with controlling functional operations of an appliance, comprising:
    detecting by a second smart device, via use of data received from the appliance by the second smart device, a presence of the appliance on a wireless network, wherein the wireless network includes both the second smart device and the first smart device;
    providing from the second smart device to the server device the data received from the appliance;
    providing from the second smart device to the server device an identifier for the wireless network;
    receiving by the first smart device a first app that was caused to be automatically downloaded from the server device to the first smart device in response to the server device receiving from the second smart device both the data received from the appliance and the identifier for the wireless network; and
    causing installation of the first app that was received by the first smart device from the server device on the first smart device whereupon the first app is usable with the first smart device to provide at least a controlling interface between the first smart device and the appliance.

2. The method as recited in claim 1, further comprising receiving at the first smart device from the server device data related to a state of a second app, having an identifier that corresponds to the identifier for the first app, that was prior installed within the wireless network and using the data related the state of the second app to cause a state of the first app, when installed on the first smart device, to be synchronized with the state of the second app.

3. The method as recited in claim 1, wherein the data received from the appliance comprises data indicative of a manufacturer and model of the appliance.

4. The method as recited in claim 1, wherein the step of detecting is automatically initiated by the second smart device.

5. The method as recited in claim 1, wherein the step of detecting is initiated by the second smart device in response to user input being provided to the first smart device.

6. The method as recited in claim 1, wherein the data received from the appliance comprises a serial number provided to the appliance.

7. The method as recited in claim 1, wherein the data received from the appliance comprises a MAC address provided to the appliance.

8. The method as recited in claim 1, wherein the first app is automatically installed on the first smart device.

9. The method as recited in claim 1, wherein the identifier for the wireless network comprises a user identifier.

10. The method as recited in claim 1, wherein the identifier for the wireless network comprises a network name.

11. The method as recited in claim 2, wherein the data related to a state of the second app comprises data indicative of control setting for the appliance.

12. The method as recited in claim 2, wherein the data related to a state of the second app comprises interface settings for the app that was prior installed on the second smart device.

13. The method as recited in claim 2, wherein the data related to a state of the second app comprises cookie data.

* * * * *